US010042330B2

(12) United States Patent
McLaughlin et al.

(10) Patent No.: US 10,042,330 B2
(45) Date of Patent: Aug. 7, 2018

(54) REDUNDANT PROCESS CONTROLLERS FOR SEGREGATED SUPERVISORY AND INDUSTRIAL CONTROL NETWORKS

(71) Applicant: Honeywell International Inc., Morristown, NJ (US)

(72) Inventors: Paul F. McLaughlin, Ambler, PA (US); Jason T. Urso, Fountain Hills, AZ (US); Michael L. Baker, Perkasie, PA (US); Jay Gustin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 83 days.

(21) Appl. No.: 14/272,058

(22) Filed: May 7, 2014

(65) Prior Publication Data

US 2015/0323910 A1     Nov. 12, 2015

(51) Int. Cl.
*G05B 9/03*     (2006.01)
*H04L 29/08*   (2006.01)

(52) U.S. Cl.
CPC ............... *G05B 9/03* (2013.01); *H04L 67/10* (2013.01)

(58) Field of Classification Search
CPC .. G06F 11/1658; G06F 11/18; G06F 11/2002; G06F 11/2005; G06F 11/202
See application file for complete search history.

(56) References Cited

U.S. PATENT DOCUMENTS 4,679,189 A   7/1987 Olson et al.
4,958,270 A * 9/1990 McLaughlin ............ G05B 9/03
                                                              700/82
5,537,414 A   7/1996 Takiyasu et al.
5,566,356 A  10/1996 Taketsugu
5,664,195 A   9/1997 Chatterji
5,749,053 A   5/1998 Kusaki et al.
(Continued)

FOREIGN PATENT DOCUMENTS

DE        4134207 C1      4/1993
DE   103 14 721 A1       11/2004
(Continued)

OTHER PUBLICATIONS

International Search Report dated Jun. 22, 2015 in connection with International Application No. PCT/US2015/026787; 5 pages.
(Continued)

*Primary Examiner* — Bryce P Bonzo
*Assistant Examiner* — Katherine Lin
(74) *Attorney, Agent, or Firm* — Anthony Miologos

(57) ABSTRACT

A system includes redundant first process controllers configured to communicate over redundant supervisory networks in an industrial process control and automation system. Each first process controller is configured to operate in primary or secondary mode. The system also includes redundant second process controllers configured to communicate over redundant industrial control networks in the industrial process control and automation system. Each second process controller is configured to operate in primary or secondary mode. The system further includes a private network configured to communicatively couple the first and second process controllers. Each controller could be associated with at least three Media Access Control (MAC) addresses.

21 Claims, 4 Drawing Sheets

(56) References Cited

U.S. PATENT DOCUMENTS

| | | | |
|---|---|---|---|
| 5,898,826 A | 4/1999 | Pierce et al. |
| 6,170,044 B1 | 1/2001 | McLaughlin et al. |
| 6,192,232 B1 | 2/2001 | Iseyama |
| 6,256,297 B1 | 7/2001 | Haferbeck et al. |
| 6,272,386 B1 | 8/2001 | McLaughlin et al. |
| 6,292,905 B1 | 9/2001 | Wallach et al. |
| 6,374,352 B1 | 4/2002 | Goldman et al. |
| 6,427,071 B1 | 7/2002 | Adams et al. |
| 6,437,692 B1 | 8/2002 | Petite et al. |
| 6,631,416 B2 | 10/2003 | Bendinelli et al. |
| 6,694,447 B1 | 2/2004 | Leach et al. |
| 6,701,453 B2 | 3/2004 | Chrabaszcz |
| 6,751,219 B1 | 6/2004 | Lipp et al. |
| 6,847,316 B1 | 1/2005 | Keller |
| 6,850,486 B2 | 2/2005 | Saleh et al. |
| 6,917,584 B2 | 7/2005 | Kuwabara |
| 6,963,781 B2 | 11/2005 | Fehrer et al. |
| 6,983,303 B2 * | 1/2006 | Pellegrino | G06F 3/0601 709/203 |
| 7,031,308 B2 | 4/2006 | Garcia-Luna-Aceves et al. |
| 7,035,937 B2 | 4/2006 | Haas et al. |
| 7,058,848 B2 | 6/2006 | Sicola et al. |
| 7,190,961 B2 | 3/2007 | Burr |
| 7,203,743 B2 | 4/2007 | Shah-Heydari |
| 7,236,987 B1 | 6/2007 | Faulkner et al. |
| 7,240,188 B2 | 7/2007 | Takata et al. |
| 7,275,157 B2 | 9/2007 | Cam Winget |
| 7,366,114 B2 | 4/2008 | Park et al. |
| 7,440,735 B2 | 10/2008 | Karschnia et al. |
| 7,460,865 B2 | 12/2008 | Nixon et al. |
| 7,620,409 B2 | 11/2009 | Budampati et al. |
| 7,688,802 B2 | 3/2010 | Gonia et al. |
| 7,792,126 B1 | 9/2010 | Montestruque et al. |
| 7,802,016 B2 | 9/2010 | Eimers-Klose et al. |
| 7,860,495 B2 | 12/2010 | McFarland |
| 8,244,838 B2 | 8/2012 | Balasubramanian et al. |
| 8,350,691 B2 | 1/2013 | McFarland |
| 8,516,355 B2 | 8/2013 | Gale et al. |
| 8,582,470 B2 | 11/2013 | Collins et al. |
| 8,681,754 B2 | 3/2014 | Ishii |
| 8,924,498 B2 | 12/2014 | McLaughlin |
| 2002/0045969 A1 | 4/2002 | Dierauer |
| 2002/0072329 A1 | 6/2002 | Bandeira et al. |
| 2002/0120671 A1 | 8/2002 | Daffner et al. |
| 2002/0122230 A1 | 9/2002 | Izadpanah et al. |
| 2002/0176396 A1 | 11/2002 | Hammel et al. |
| 2003/0003912 A1 | 1/2003 | Melpignano et al. |
| 2003/0005149 A1 | 1/2003 | Haas et al. |
| 2003/0177150 A1 | 9/2003 | Fung et al. |
| 2004/0010694 A1 | 1/2004 | Collens et al. |
| 2004/0028023 A1 | 2/2004 | Mandhyan et al. |
| 2004/0029553 A1 | 2/2004 | Cain |
| 2004/0083833 A1 | 5/2004 | Hitt et al. |
| 2004/0174829 A1 | 9/2004 | Ayyagari |
| 2004/0230899 A1 | 11/2004 | Pagnano et al. |
| 2004/0259533 A1 | 12/2004 | Nixon et al. |
| 2005/0005200 A1 | 1/2005 | Matena et al. |
| 2005/0059379 A1 | 3/2005 | Sovio et al. |
| 2005/0071708 A1 | 3/2005 | Bartfai et al. |
| 2005/0102562 A1 | 5/2005 | Shinohara et al. |
| 2005/0141553 A1 | 6/2005 | Kim et al. |
| 2005/0164684 A1 | 7/2005 | Chen et al. |
| 2005/0201349 A1 | 9/2005 | Budampati |
| 2005/0228509 A1 | 10/2005 | James |
| 2005/0254653 A1 | 11/2005 | Potashnik et al. |
| 2005/0281215 A1 | 12/2005 | Budampati et al. |
| 2005/0289553 A1 | 12/2005 | Miki |
| 2006/0002368 A1 | 1/2006 | Budampati et al. |
| 2006/0015641 A1 | 1/2006 | Ocko et al. |
| 2006/0039347 A1 | 2/2006 | Nakamura et al. |
| 2006/0083200 A1 | 4/2006 | Emeott et al. |
| 2006/0104301 A1 | 5/2006 | Beyer et al. |
| 2006/0128349 A1 | 6/2006 | Yoon |
| 2006/0171344 A1 | 8/2006 | Subramanian et al. |
| 2006/0171346 A1 | 8/2006 | Kolavennu et al. |
| 2006/0227729 A1 | 10/2006 | Budampati et al. |
| 2006/0256740 A1 | 11/2006 | Koski |
| 2006/0271814 A1 | 11/2006 | Fung et al. |
| 2006/0274644 A1 | 12/2006 | Budampati et al. |
| 2006/0274671 A1 | 12/2006 | Budampati et al. |
| 2006/0282498 A1 | 12/2006 | Muro |
| 2006/0287001 A1 | 12/2006 | Budampati et al. |
| 2007/0022317 A1 | 1/2007 | Chen et al. |
| 2007/0030816 A1 | 2/2007 | Kolavennu |
| 2007/0030832 A1 | 2/2007 | Gonia et al. |
| 2007/0067458 A1 | 3/2007 | Chand |
| 2007/0073861 A1 | 3/2007 | Amanuddin et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0103303 A1 | 5/2007 | Shoarinejad |
| 2007/0147294 A1 | 6/2007 | Bose et al. |
| 2007/0153677 A1 | 7/2007 | McLaughlin et al. |
| 2007/0153789 A1 | 7/2007 | Barker, Jr. et al. |
| 2007/0155423 A1 | 7/2007 | Carmody et al. |
| 2007/0237137 A1 | 10/2007 | McLaughlin |
| 2007/0261052 A1 | 11/2007 | Bale et al. |
| 2007/0280178 A1 | 12/2007 | Hodson et al. |
| 2008/0043637 A1 | 2/2008 | Rahman |
| 2008/0140844 A1 | 6/2008 | Halpern |
| 2008/0225737 A1 | 9/2008 | Gong et al. |
| 2008/0267259 A1 | 10/2008 | Budampati et al. |
| 2008/0273547 A1 | 11/2008 | Phinney |
| 2009/0022121 A1 | 1/2009 | Budampati et al. |
| 2009/0034441 A1 | 2/2009 | Budampati et al. |
| 2009/0060192 A1 | 3/2009 | Budampati et al. |
| 2009/0080394 A1 | 3/2009 | Ishii |
| 2009/0086692 A1 | 4/2009 | Chen |
| 2009/0109889 A1 | 4/2009 | Budampati et al. |
| 2010/0246385 A1 * | 9/2010 | Balasumbramanian | G05B 19/0423 370/222 |
| 2012/0117416 A1 * | 5/2012 | McLaughlin | G06F 11/1658 714/4.11 |
| 2012/0210198 A1 | 8/2012 | Gale et al. |
| 2014/0040657 A1 | 2/2014 | Kiessling et al. |
| 2014/0277592 A1 * | 9/2014 | Crater | G05B 19/052 700/9 |
| 2015/0177708 A1 * | 6/2015 | McDonald | G05B 19/0423 700/52 |

FOREIGN PATENT DOCUMENTS

| | | |
|---|---|---|
| DE | 10314721 A1 | 11/2004 |
| EP | 1 081 895 A1 | 3/2001 |
| EP | 1 401 171 A2 | 3/2004 |
| EP | 1 401 171 A3 | 3/2004 |
| EP | 1 439 667 A2 | 7/2004 |
| GB | 2 427 329 A | 12/2006 |
| WO | WO 01/35190 A2 | 5/2001 |
| WO | WO 01/35190 A3 | 5/2001 |
| WO | WO 03/079616 A1 | 9/2003 |
| WO | WO 2004/047385 A2 | 6/2004 |
| WO | WO 2004/047385 A3 | 6/2004 |
| WO | WO 2004/114621 A1 | 12/2004 |
| WO | WO 2006/017994 A1 | 2/2006 |
| WO | WO 2006/053041 A1 | 5/2006 |

OTHER PUBLICATIONS

Written Opinion of the International Searching Authority dated Jun. 22, 2015 in connection with International Application No. PCT/US2015/026787; 5 pages.

Salman Taherian, et al., "Event Dissemination in Mobile Wireless Sensor Networks", 2004 IEEE International Conference on Mobile Ad-Hoc and Sensor Systems, p. 573-575.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

(56) References Cited

OTHER PUBLICATIONS

Dr. Soumitri Kolavennu, Presentation, "WNSIA MAC Layer", ISA SP100 meeting, Feb. 14, 2007, 24 pages, see esp. p. 17.
Ying Zhang, et al., "A Learning-based Adaptive Routing Tree for Wireless Sensor Networks", Journal of Communications, vol. 1, No. 2, May 2006, p. 12-21.
Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.
Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.
"XYR 5000 Wireless Transmitters, Honeywell Solutions for Wireless Data Acquisiton and Monitoring," www.acs.honeywell.com, Feb. 2006, 6 pages.
Christopher Pulini, et al. "Gateway Supporting Transparent Redundancy in Process Control Systems and Other Systems and Related Method", U.S. Appl. No. 12/762,215, filed Apr. 16, 2010.
A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.
International Search Report and Written Opinion of the International Searching Authority in PCT Application No. PCT/US2007/069717 dated Dec. 10, 2007.
International Search Report and Written Opinion of the International Searching Authority in PCT Application No. PCT/US2007/069614 dated Nov. 22, 2007.
International Search Report and Written Opinion of the International Searching Authority in PCT Application No. PCT/US2007/069710 dated Nov. 27, 2007.
International Search Report and Written Opinion of the International Searching Authority in PCT Application No. PCT/US2007/069705 dated Apr. 15, 2008.
Pereira, J.M. Dias, "A Fieldbus Prototype for Educational Purposes", IEEE Instrumentation & Measurement Magazine, New York, NY vol. 7, No. 1, Mar. 2004, p. 1-2.
International Search Report and Written Opinion of the International Searching Authority in PCT Application No. PCT/US2006/048334 dated Jul. 5, 2007.
Ramakrishna S. Budampati, et al., "Apparatus and Method for Improving the Reliability of Industrial Wireless Networks That Experience Outages in Backbone Connectivity", U.S. Appl. No. 12/869,557, filed Aug. 26, 2010.
Rahul Mangharam, et al., "Embedded Virtual Machines for Robust Wireless Control Systems", 29th IEEE Int'l. Conf. on Distributed Computing Systems, Jun. 2009, 6 pages.
Jason Hill, et al., "System Architecture Directions for Networked Sensors", ASPLOS-IX, Nov. 2000, Cambridge, MA, 12 pages.
Philip Levis, et al., "Mate: A Tiny Virtual Machine for Sensor Networks", ACM ASPLOS-X, 2002, 11 pages.
Phillip Stanley-Marbell, et al., "Scylla: A Smart Virtual Machine for Mobile Embedded Systems", In WMCSA, 2000, 10 pages.
Rene Muller, et al., "A Virtual Machine for Sensor Networks", ACM EuroSys, 2007, 14 pages.
Chih-Chieh Han, et al., "A Dynamic Operating System for Sensor Nodes", MobiSys, 2005: The Third International Conference on Mobile Systems, Applications, and Services, p. 163-176.
Adam Dunkels, et al., "Run-Time Dynamic Linking for Reprogramming Wireless Sensor Networks", SenSys '06, Nov. 1-3, 2006, Boulder, Colorado, 14 pages.
Rahul Mangharam, et al., "FireFly: A Cross-Layer Platform for Real-Time Sensor Networks", Real Time Systems Journal, 2007, 40 pages.
Jason Hill, et al., "The Platforms Enabling Wireless Sensor Networks", Communications of the ACM, Jun. 2004, vol. 47, No. 6, p. 41-46.
Anthony Rowe, et al., "RT-Link: A Time-Synchronized Link Protocol for Energy-Constrained Multi-hop Wireless Networks", IEEE SECON, 2006, 10 pages.
Rahul Mangharam, et al., "Voice over Sensor Networks", RTSS, 2006, 10 pages.
Joseph Polastre, et al., "Versatile Low Power Media Access for Wireless Sensor Networks", SenSys '04, Nov. 3-5, 2004, Baltimore, Maryland, 13 pages.
Wei Ye, et al., "An Energy-Efficient MAC protocol for Wireless Sensor Networks", USC/ISI Technical Report ISI-TR-543, INFOCOM, Jun. 2002, p. 1-10.
"FireFly 2.2 Datasheet", Wireless Sensor Networks, Aug. 20, 2007, 24 pages.
"Nano-RK: A Wireless Sensor Networking Real-Time Operating System", http://nanork.org/wiki, 3 pages.
U.S. Office Action dated Aug. 6, 2014 in connection with U.S. Appl. No. 12/628,918; 19 pages.

* cited by examiner

REDUNDANT PROCESS CONTROLLERS FOR SEGREGATED SUPERVISORY AND INDUSTRIAL CONTROL NETWORKS

TECHNICAL FIELD

This disclosure relates generally to industrial process control and automation systems. More specifically, this disclosure relates to redundant process controllers for segregated supervisory and industrial control networks.

BACKGROUND

Industrial process control and automation systems are routinely used to automate large and complex industrial processes. These types of systems typically include sensors, actuators, and controllers. Lower-level controllers are often used to receive measurements from the sensors and generate control signals for the actuators. The lower-level controllers communicate with the sensors and actuators over one or more "industrial control" networks. The lower-level controllers also communicate with higher-level controllers over one or more "supervisory" networks.

SUMMARY

This disclosure provides redundant process controllers for segregated supervisory and industrial control networks.

In a first embodiment, a system includes redundant first process controllers configured to communicate over redundant supervisory networks in an industrial process control and automation system. Each first process controller is configured to operate in primary or secondary mode. The system also includes redundant second process controllers configured to communicate over redundant industrial control networks in the industrial process control and automation system. Each second process controller is configured to operate in primary or secondary mode. The system further includes a private network configured to communicatively couple the first and second process controllers.

In a second embodiment, an apparatus includes a first process controller having first and second network interfaces configured to communicate over redundant networks in an industrial process control and automation system. The first process controller also has a third network interface configured to communicate with a second process controller over a private network. The first process controller further has at least one processing device configured to operate the first process controller in primary or secondary mode. The at least one processing device is configured to synchronize to the second process controller when the first process controller is in secondary mode.

In a third embodiment, a method includes communicating, at a first process controller using first and second network interfaces, over redundant networks in an industrial process control and automation system. The method also includes communicating, at the first process controller using a third network interface, with a second process controller over a private network. The method further includes operating the first process controller in primary or secondary mode, where the first process controller when in secondary mode is configured to synchronize to the second process controller.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
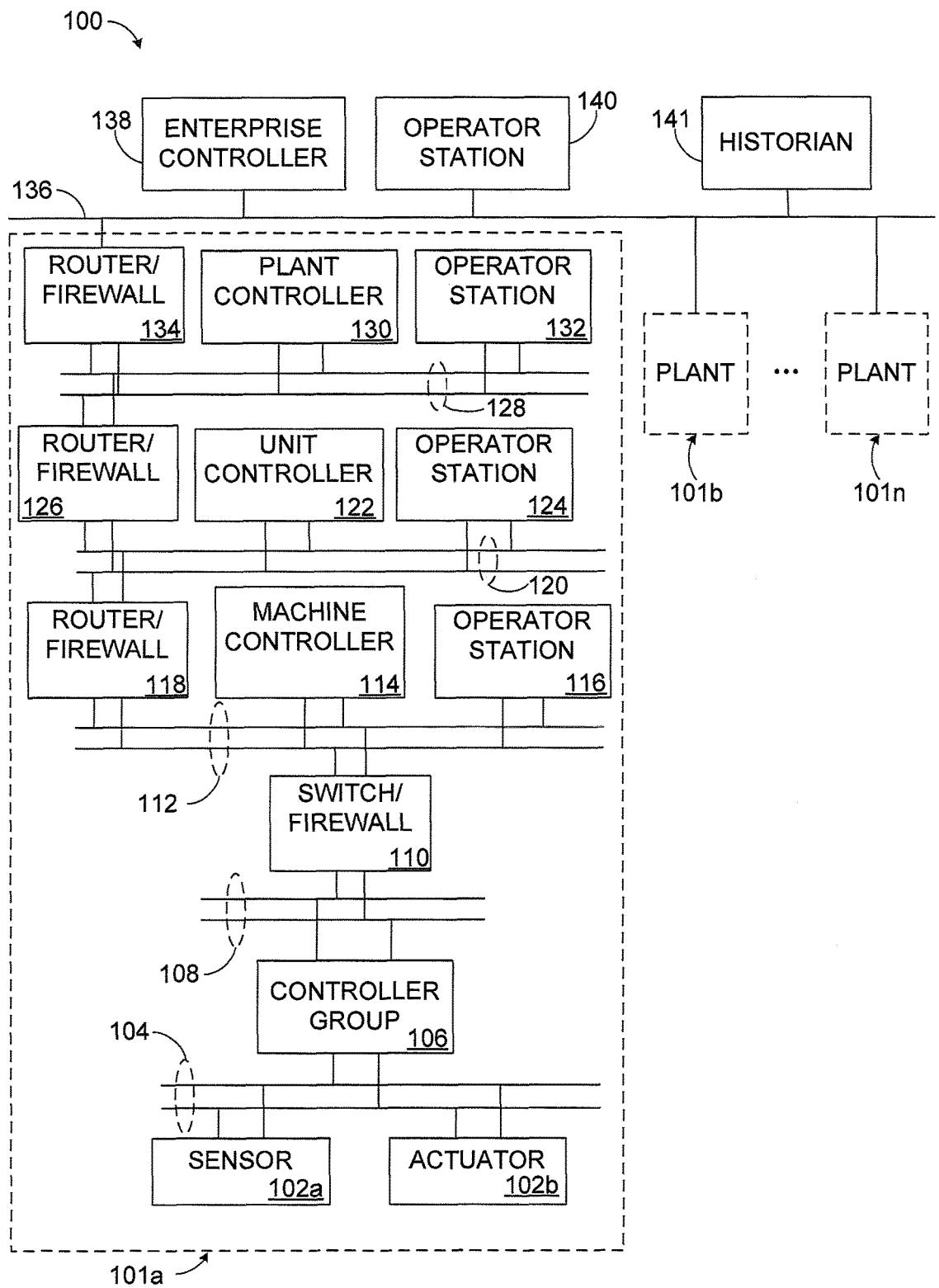
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

Redundant networks 104 are coupled to the sensors 102a and actuators 102b. The networks 104 facilitate interaction with the sensors 102a and actuators 102b. For example, the networks 104 could transport measurement data from the sensors 102a and provide control signals to the actuators 102b. The networks 104 could represent any suitable redundant networks. As particular examples, the networks 104 could represent redundant IEC-61850, IEC-62439, Ethernet/IP (EIP), or MODBUS/TCP networks. The networks 104 can have any suitable configuration, such as a parallel or ring topology. The networks 104 are often referred to as "industrial control" networks since these networks transport data used directly to control the underlying process system.

In the Purdue model, "Level 1" includes one or more controller groups 106, which are coupled to the networks 104. Among other things, each controller group 106 may use the measurements from one or more sensors 102a to control the operation of one or more actuators 102b. Each controller in the controller groups 106 includes any suitable structure for controlling one or more aspects of a process system. As a particular example, each controller in the controller groups 106 could represent a computing device running a real-time operating system.

Redundant networks 108 are coupled to the controller groups 106. The networks 108 facilitate interaction with the controller groups 106, such as by transporting data to and from the controller groups 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC. The networks 108 are often referred to as "supervisory" networks since these networks transport data used to supervise the underlying "Level 1" controllers.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controller groups 106, sensors 102a, and actuators 102b, which could be associated with a particular piece of industrial equipment (such as a boiler or other machine). For example, the machine-level controllers 114 could log information collected or generated by the controller groups 106, such as measurement data from the sensors 102a or control signals for the actuators 102b. The machine-level controllers 114 could also execute applications that control the operation of the controller groups 106, thereby controlling the operation of the actuators 102b. In addition, the machine-level controllers 114 could provide secure access to the controller groups 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controller groups 106, sensors 102a, and actuators 102b).

One or more operator stations 116 are coupled to the networks 112. The operator stations 116 represent computing or communication devices providing user access to the machine-level controllers 114, which could then provide user access to the controller groups 106 (and possibly the sensors 102a and actuators 102b). As particular examples, the operator stations 116 could allow users to review the operational history of the sensors 102a and actuators 102b using information collected by the controller groups 106 and/or the machine-level controllers 114. The operator stations 116 could also allow the users to adjust the operation of the sensors 102a, actuators 102b, controller groups 106, or machine-level controllers 114. In addition, the operator stations 116 could receive and display warnings, alerts, or other messages or displays generated by the controller groups 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controller groups 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 141 is also coupled to the network 136 in this example. The historian 141 could represent a component that stores various information about the system 100. The historian 141 could, for example, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

As described above, lower-level controllers (such as Level 1 controllers in the controller groups 106) communicate with the sensors 102a and actuators 102b over one or more industrial control networks 104. The lower-level controllers also communicate with higher-level controllers or other devices/systems over one or more supervisory networks 108.

Controllers at Level 1 of the Purdue model therefore often need to communicate over multiple types of networks. For various reasons, industrial process control and automation systems often need to segregate the traffic over industrial control networks from the traffic over supervisory networks. The segregation may be needed for various reasons, such as high availability, network protocol conflict, performance, or other reasons related to the networks or the controllers. Also, it is often necessary or desirable to maintain redundancy of both networks and controllers, which helps to ensure that no single point of failure renders part of a process system unreachable. However, industrial control networks and supervisory networks often support redundancy mechanisms that are different or that conflict with one another.

In accordance with this disclosure, as described in more detail below, each controller group 106 includes redundant controllers used to segregate the industrial control and supervisory networks 104, 108. For example, each controller group 106 could include at least four controllers. At least two controllers can be connected to the industrial control networks 104 and function as redundant controllers that interact with sensors and actuators. At least two other controllers can be connected to the supervisory networks 108 and function as redundant controllers that interact with higher-level controllers. In addition, the controllers in the controller group 106 can communicate with one another using a private network. In particular embodiments, the controllers in a controller group 106 and the private network could all be located within a single cabinet, and the private network may not be addressable or accessible from any private or public network.

In this way, redundant controllers can be provided for both the supervisory and industrial control networks, helping to increase the reliability of control operations for a process system. Moreover, since different controllers are connected to different networks, segregation of network traffic can be done more easily and reliably. Further, communications between controllers can occur over a private network that can be secured, helping to ensure the reliability and security of inter-controller communications. In addition, when the controllers and private network are implemented using a common set of hardware, this can increase the ease of various functions such as spare parts management, failure/repair maintenance, installation, mounting, and power system management.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which controller groups can be used. This functionality can be used in any other suitable device or system.

Figure 2:
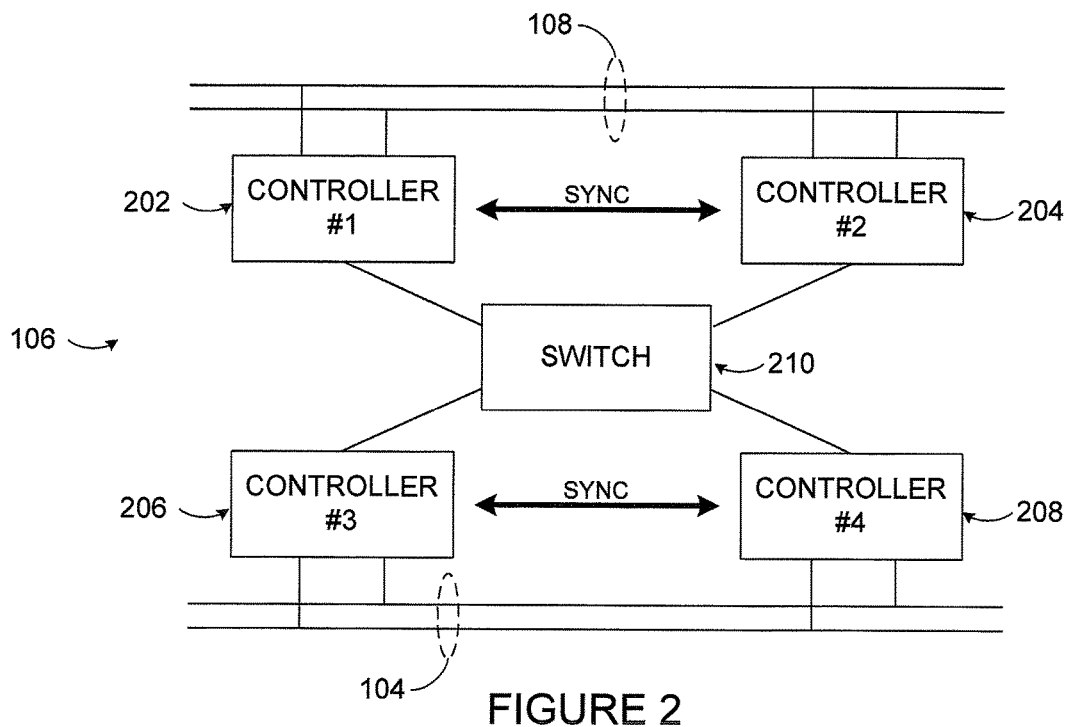
FIGS. 2 and 3 illustrate example controller groups having redundant process controllers for segregated supervisory and industrial control networks according to this disclosure.
Figure 3:
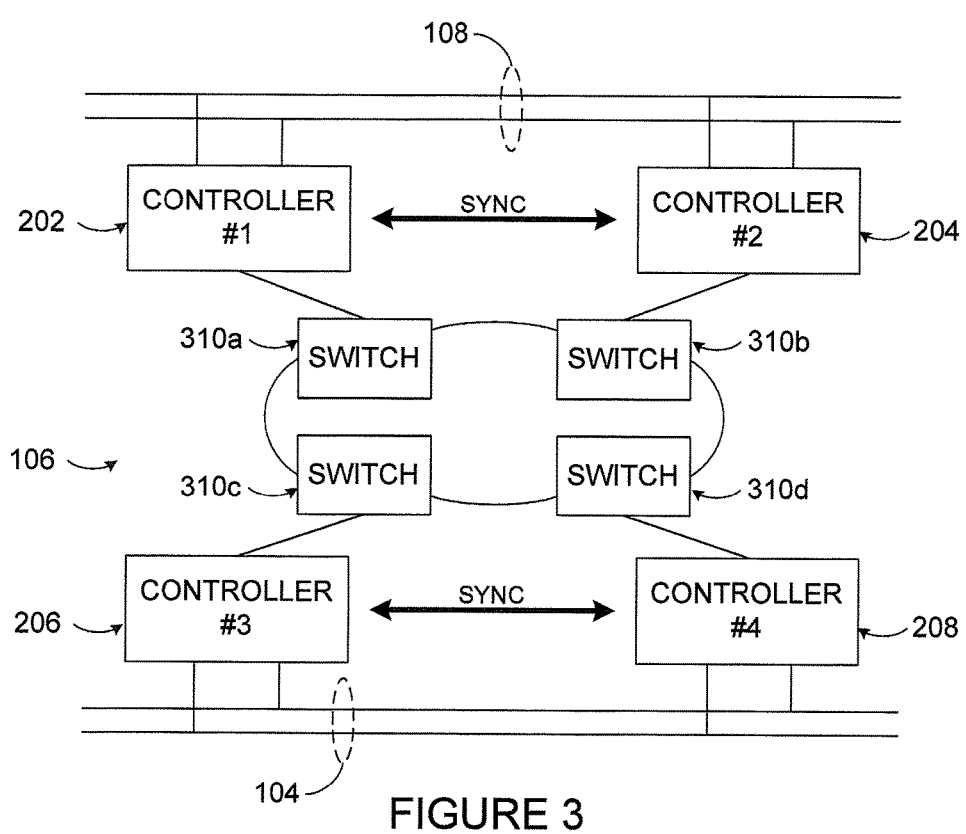

FIGS. 2 and 3 illustrate example controller groups 106 having redundant process controllers for segregated supervisory and industrial control networks according to this disclosure. For ease of explanation, the controller groups 106 are described as being used in the industrial process control and automation system 100 of FIG. 1. However, the controller groups 106 could be used in any other suitable system.

As shown in FIG. 2, the controller group 106 includes a first pair of redundant controllers 202-204 and a second pair of redundant controllers 206-208. The first pair of controllers 202-204 is connected to the supervisory networks 108, such as an FTE network. These controllers 202-204 could communicate with higher-level controllers, such as higher-level controllers that implement planning, scheduling, or optimization functions. The controllers 202-204 could also support applications, operational displays, alarm management, and other functions and interconnect to other Level 1 control networks.

The second pair of controllers 206-208 is connected to the industrial control networks 104, such as IEC-61850, IEC-62439, Ethernet/IP, or MODBUS/TCP networks. These controllers 206-208 could communicate with the sensors 102a and implement control logic for controlling the actuators 102b. The controllers 206-208 could also interact with the controllers 202-204 to thereby allow the controllers 202-204 to configure, adjust, and control the operations of the controllers 206-208.

Note that this functional division is for illustration only and that other functional divisions could be used amongst the controllers in a controller group 106. For example, control functions for controlling actuators could be executed by the controllers 202-204, the controllers 206-208, or both types of controllers 202-208 (such as in a peer-to-peer manner). In particular embodiments, to support appropriate interactions, control objects in the controllers 206-208 could be accessible by the controllers 202-204.

In the arrangement shown in FIG. 2, the controllers 202-204 are configured to communicate over the redundant supervisory networks 108 without needing to be configured or have the ability to communicate over the industrial control networks 104. Similarly, the controllers 206-208 are configured to communicate over the redundant industrial control networks 104 without needing to be configured or have the ability to communicate over the supervisory networks 108. Traffic control can be used to help ensure that only necessary or desired traffic is transferred from one network to the other network via the controllers 202-208.

In this example, a switch 210 facilitates communication between the controllers 202-208. For example, the switch 210 can transport synchronization data between the controllers 202-204 so that a secondary one of the controllers 202-204 is synchronized with a primary one of the controllers 202-204. This allows the secondary controller 202-204 to take over operations for the primary controller 202-204 upon a failure of the primary controller. Each controller 202-204 can operate in the primary or secondary mode of operation. Similarly, the switch 210 can transport synchronization data between the controllers 206-208 so that a secondary one of the controllers 206-208 is synchronized with a primary one of the controllers 206-208. This allows the secondary controller 206-208 to take over operations for the primary controller 206-208 upon a failure of the primary controller. Each controller 206-208 can operate in the primary or secondary mode of operation. The switch 210 includes any suitable structure for transporting data between networked devices.

Note that in FIG. 2, a single switch 210 is used to interconnect the controllers 202-208 in the controller group 106. As shown in FIG. 3, multiple switches can also be used to interconnect the controllers 202-208 in a controller group 106. In the example shown in FIG. 3, four switches 310a-310d are connected in a ring configuration, and each switch 310a-310d is connected to one of the controllers 202-208. In this arrangement, there is no single point of failure in the controller group 106. One switch 310a-310d can fail, and the remaining switches can maintain connectivity between all controllers 202-208. While shown in a ring configuration, any other suitable arrangement of multiple switches could be used.

In FIGS. 2 and 3, the switches 210 and 310a-310d support a private network between the controllers 202-208 in the controller group 106. For example, each controller 202-208 could be joined with a private medium access control (MAC) network to form a private and secure network between controllers. In particular embodiments, each controller 202-208 includes at least three MAC ports (and associated MAC addresses). Two MAC ports can be used to connect to the redundant networks 104 or 108, and one MAC port can be used to connect to the switch 210 or 310a-310d for communication over the private network.

Each controller 202-208 includes any suitable structure configured to perform control operations in an industrial process control and automation system. As a particular example, the controllers 202-204 could represent C300 controllers from HONEYWELL INTERNATIONAL INC., which can implement power distribution subsystem control strategies and support standard SERIES C input/output (I/O) functions. The controllers 202-204 could lack support for any smart field device protocols, such as PROFIBUS, MODBUS, FOUNDATION FIELDBUS, EXCHANGE BLOCKS, EIP, or PEER CONTROL DATA INTERFACE (PCDI) protocols. One or more of these smart field device protocols could be supported by the controllers 206-208, and the controllers 202-204 can be used to proxy traffic to or from the controllers 206-208.

Although FIGS. 2 and 3 illustrate examples of controller groups 106 having redundant process controllers for segregated supervisory and industrial control networks, various changes may be made to FIGS. 2 and 3. For example, a controller group 106 could include more or fewer controllers. Also, any suitable number and configuration of switches or other network devices could be used to interconnect the controllers in a controller group.

Figure 4:
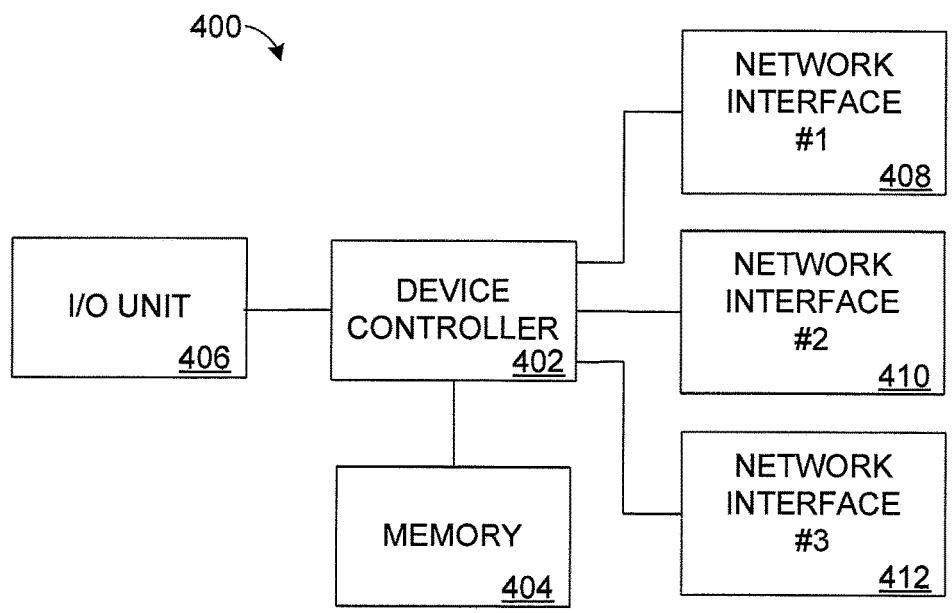
FIG. 4 illustrates an example process controller configured to support segregated supervisory and industrial control networks according to this disclosure.

FIG. 4 illustrates an example process controller 400 configured to support segregated supervisory and industrial control networks according to this disclosure. For ease of explanation, the process controller 400 is described as being used as the controllers 202-208 of FIGS. 2 and 3 in the controller group 106 of FIG. 1. The controller 400 could be used in any other suitable controller group and in any other suitable system.

As shown in FIG. 4, the process controller 400 includes at least one device controller 402. The device controller 402 controls the overall operation of the process controller 400. For example, the device controller 402 may execute control logic for interacting with higher-level controllers or controlling one or more actuators based on sensor measurements. The device controller 402 includes any suitable structure for controlling the operation of a process controller. As particular examples, the device controller 402 could represent at least one microprocessor, microcontroller, field programmable gate array (FPGA), application specific integrated circuit (ASIC), discrete logic, or other processing or control device(s).

At least one memory 404 is coupled to the device controller 402. The memory 404 stores any of a wide variety of information used, collected, or generated by the process controller 400. The memory 404 includes any suitable volatile and/or non-volatile storage and retrieval device or devices.

At least one I/O unit 406 facilitates input to or output from the process controller 400. For example, the I/O unit 406 could include inputs for receiving data from a keyboard, mouse, touchscreen, or other input device. The I/O unit 406 could also include outputs for providing data to a display or other output device.

The process controller 400 further includes multiple network interfaces 408-412. The network interfaces 408-412 facilitate communication over multiple networks. For example, two of the network interfaces 408-410 allow the process controller 400 to communicate over redundant networks, such as the redundant supervisory networks 108 or the redundant industrial control networks 104. The third network interface 412 allows the process controller 400 to communicate over a private network, such as via the switch 210 or one or more switches 310a-310d. Each network interface 408-412 includes any suitable structure for transmitting and/or receiving signals over a network, such as a MAC port.

Although FIG. 4 illustrates one example of a process controller 400 configured to support segregated supervisory and industrial control networks, various changes may be made to FIG. 4. For example, various components in FIG. 4 could be combined, subdivided, or omitted and additional components could be added according to particular needs. Also, the process controller 400 could include more than three network interfaces.

Figure 5:
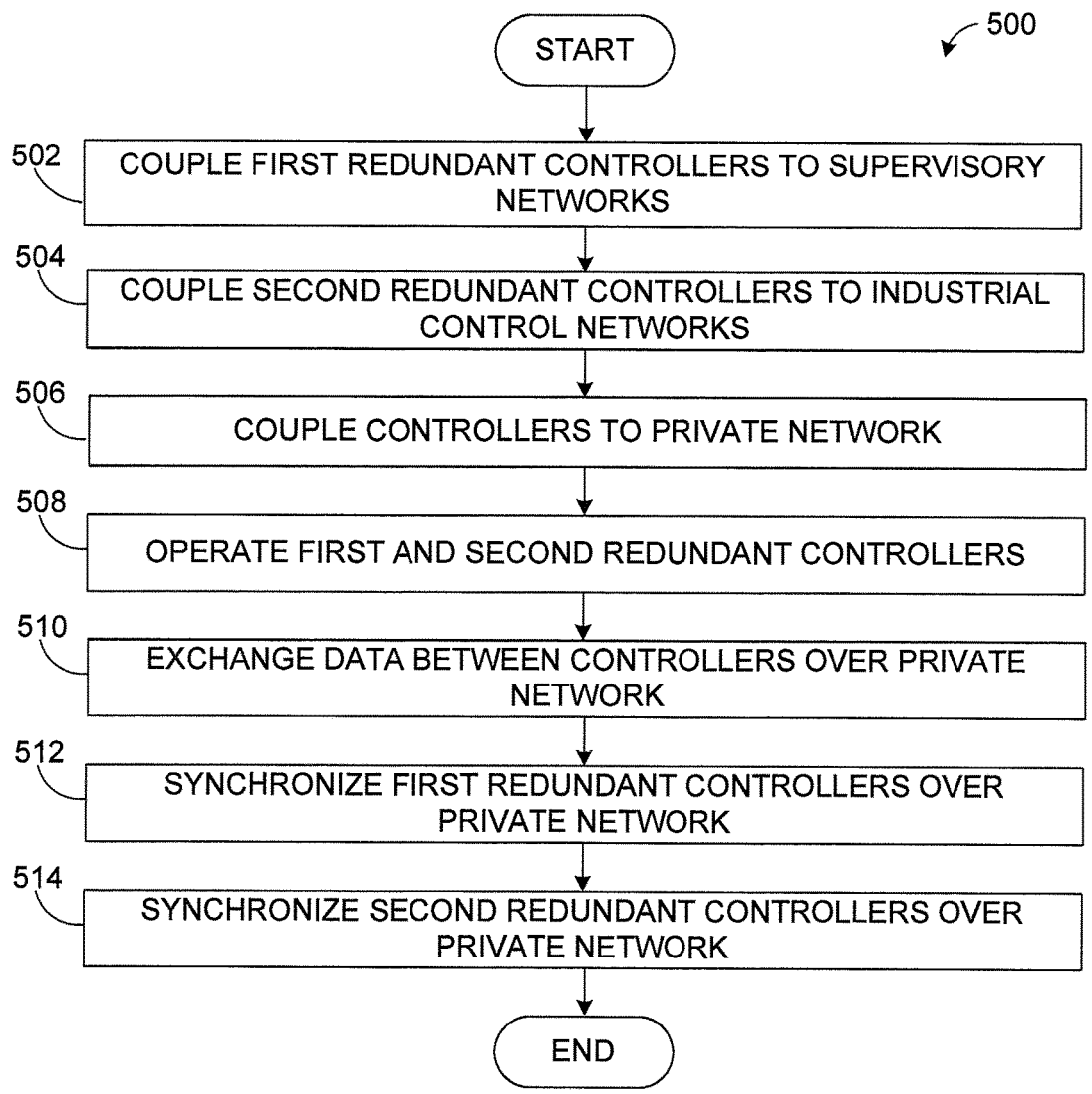
FIG. 5 illustrates an example method of using redundant process controllers for segregated supervisory and industrial control networks according to this disclosure.

FIG. 5 illustrates an example method 500 of using redundant process controllers for segregated supervisory and industrial control networks according to this disclosure. As shown in FIG. 5, first redundant controllers are coupled to supervisory networks at step 502, and second redundant controllers are coupled to industrial control networks at step 504. This could include, for example, coupling the network interfaces 408-410 of a pair of C300 or other controllers 202-204 to the supervisory networks 108. This could also include coupling the network interfaces 408-410 of a pair of PROFIBUS, MODBUS, FOUNDATION FIELDBUS, EXCHANGE BLOCKS, EIP, PCDI, or other controllers 206-208 to the industrial control networks 104.

The controllers are coupled to a private network at step 506. This could include, for example, coupling the network interfaces 412 of the controllers 202-208 to one or more switches 210, 310a-310d. This could also include joining the controllers 202-208 with a private MAC to form a private and secure network.

The first and second controllers are operated at step 508. This could include, for example, the controllers 202-204 communicating with higher-level controllers over the supervisory networks 108; supporting applications, operational displays, alarm management, and other functions; and interconnecting to other Level 1 control networks. This could also include the controllers 206-208 communicating with the sensors 102a and controlling the actuators 102b. As part of this process, the first and second controllers exchange data with one another over the private network at step 510. This could include, for example, the controllers 202-204 providing data from higher-level controllers to the controllers 206-208. This could also include the controllers 206-208 providing data for the higher-level controllers to the controllers 202-204, which act as proxies for the controllers 206-208.

During their operations, the first controllers are synchronized with one another over the private network at step 512, and the second controllers are synchronized with one another over the private network at step 514. This could include, for example, a primary one of the controllers 202-204 providing data to a secondary one of the controllers 202-204 so that the secondary controller can synchronize to the primary controller. This could also include a primary one of the controllers 206-208 providing data to a secondary one of the controllers 206-208 so that the secondary controller can synchronize to the primary controller.

In this way, the first controllers 202-204 need not be configured to communicate using a protocol for the industrial control networks 104, and the redundancy mechanisms of the industrial control networks 104 are hidden from the first controllers 202-204. Similarly, the second controllers 206-208 need not be configured to communicate using a protocol for the supervisory networks 108, and the redundancy mechanisms of the supervisory networks 108 are hidden from the second controllers 206-208. Moreover, this configuration supports redundancy for both supervisory and industrial control controllers, and the private network between controllers could also provide redundant paths. This provides improved robustness in the overall industrial process control and automation system.

Although FIG. 5 illustrates one example of a method 500 of using redundant process controllers for segregated supervisory and industrial control networks, various changes may be made to FIG. 5. For example, while shown as a series of steps, various steps in FIG. 5 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a set of redundant first process controllers configured to communicate over redundant supervisory networks in an industrial process control and automation system, each first process controller configured to operate in primary or secondary mode;
a set of redundant second process controllers configured to communicate over redundant industrial control networks in the industrial process control and automation system, each second process controller configured to operate in primary or secondary mode;
a private network including at least one switch, the switch configured to synchronize a primary and a secondary controller of the set of redundant first process controllers, and a primary and a secondary controller of the set of redundant second process controllers, to operate in the primary or the secondary mode,
wherein the set of redundant first process controllers is communicatively coupled to the set of redundant second process controllers only over the private network,
wherein the first process controllers are communicatively coupled to the redundant industrial control networks only through the second process controllers, and
wherein the second process controllers are communicatively coupled to the redundant supervisory networks only through the first process controllers.

2. The system of claim 1, wherein each of the first and second process controllers comprises:
first and second network interfaces configured to communicate over one of: the redundant supervisory networks and the redundant industrial control networks; and
a third network interface configured to communicate over the private network.

3. The system of claim 2, wherein each process controller is associated with at least three Media Access Control (MAC) addresses.

4. The system of claim 1, wherein the set of redundant first process controllers comprises a redundant pair of lower-level controllers configured to communicate with one or more higher-level controllers in the industrial process control and automation system.

5. The system of claim 1, wherein each of the first process controllers is configured to communicate over a redundant pair of Ethernet networks forming the redundant supervisory networks.

6. The system of claim 1, wherein the set of redundant second process controllers comprises a redundant pair of controllers configured to receive sensor measurements from one or more sensors and generate one or more control signals for at least one actuator.

7. The system of claim 1, wherein the private network comprises multiple switches arranged in a ring configuration.

8. An apparatus comprising:
a first process controller comprising:
first and second network interfaces configured to communicate over one of: redundant supervisory networks and redundant industrial control networks in an industrial process control and automation system; and
a third network interface configured to communicate with second, third, and fourth process controllers over a private network, wherein the first process controller is communicatively coupled to the third and fourth process controllers only over the private network, and wherein the third network interface is configured to communicate with another of the redundant supervisory networks and the redundant industrial control networks in the industrial process control and automation system through the third and fourth process controllers,
wherein the private network includes at least one switch, the switch configured to synchronize the first process controller to the second process controller, and the third process controller to the fourth process controller, to operate in primary or secondary mode.

9. The apparatus of claim 8, wherein the at least one switch is configured to proxy traffic to and from the third and fourth process controllers.

10. The apparatus of claim 8, wherein the first process controller is associated with at least three Media Access Control (MAC) addresses.

11. The apparatus of claim 8, wherein the first process controller comprises a lower-level controller configured to communicate with one or more higher-level controllers in the industrial process control and automation system.

12. The apparatus of claim 8, wherein the first and second network interfaces are configured to communicate over a redundant pair of Ethernet networks forming the redundant supervisory networks.

13. The apparatus of claim 8, wherein:
the first and second network interfaces are configured to communicate over the redundant industrial control networks; and
the at least one switch is configured to receive sensor measurements from one or more sensors and generate one or more control signals for at least one actuator.

14. A method comprising:
communicating, at a first process controller using first and second network interfaces, over one of: redundant supervisory networks and redundant industrial control networks in an industrial process control and automation system;
communicating, at the first process controller using a third network interface, with second, third, and fourth process controllers over a private network, wherein the first process controller is communicatively coupled to the third and fourth process controllers only over the private network, and wherein the third network interface is configured to communicate with another of the redundant supervisory networks and the redundant industrial control networks in the industrial process control and automation system through the third and fourth process controllers; and synchronizing the first process controller to the second process controller, and the third process controller to the fourth process controller, to operate in primary or secondary mode.

15. The method of claim 14, further comprising:
using the first process controller to proxy traffic to and from the third and fourth process controllers.

16. The method of claim 14, further comprising:
associating the first process controller with at least three Media Access Control (MAC) addresses.

17. The method of claim 14, wherein:
the first process controller comprises a lower-level controller that communicates with one or more higher-level controllers in the industrial process control and automation system; and
the first and second network interfaces communicate over a redundant pair of Ethernet networks forming the redundant supervisory networks.

18. The method of claim 14, wherein:
the first and second network interfaces communicate over the redundant industrial control networks; and
the first process controller receives sensor measurements from one or more sensors and generates one or more control signals for at least one actuator.

19. The system of claim 1, wherein:
each of the first process controllers is configured to communicate over the redundant supervisory networks using a first protocol,
each of the second process controllers is configured to communicate over the redundant industrial control networks using a second protocol different than the first protocol, and
the first process controllers are not configured to communicate using the second protocol.

20. The system of claim 1, wherein the private network is accessible only by the first and second sets of controllers and is not addressable or accessible from any external private or public network.

21. The system of claim 20, wherein the first and second sets of controllers and the private network reside in a common cabinet.

* * * * *